Nov. 17, 1931.　　　E. G. VANDERLIP　　　1,832,159
SAFETY DEVICE FOR AIRPLANES
Filed Sept. 12, 1930　　　2 Sheets-Sheet 1
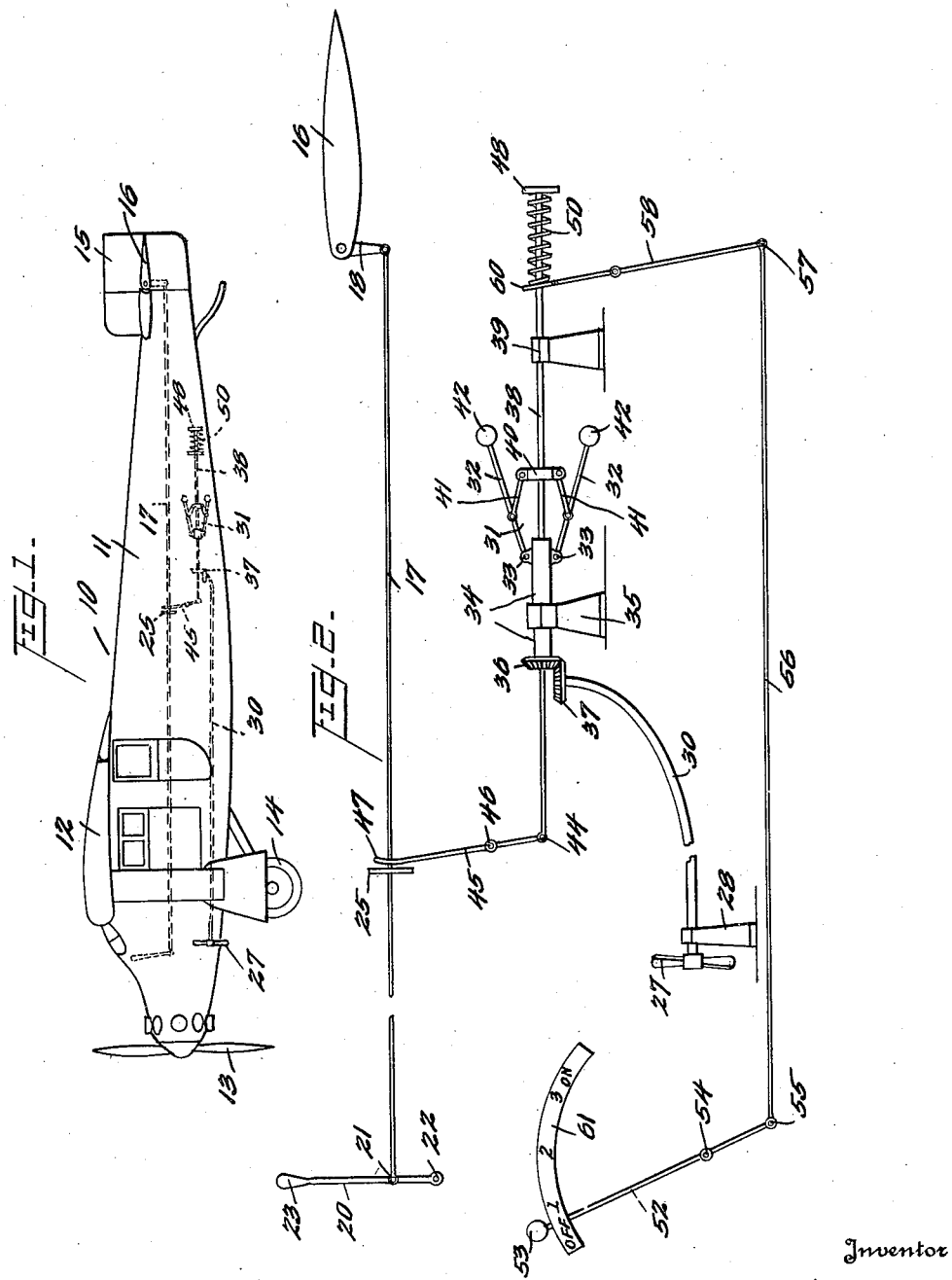

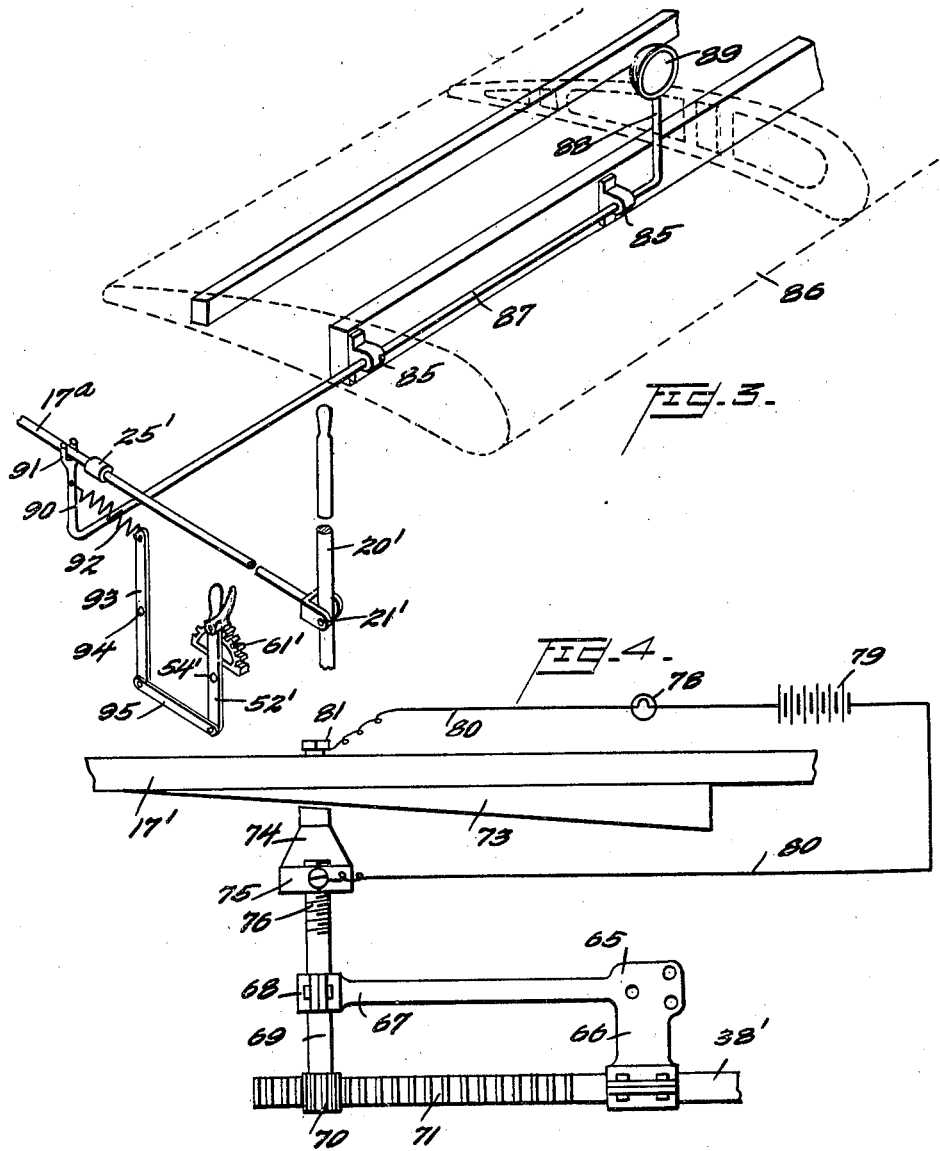

Patented Nov. 17, 1931

1,832,159

UNITED STATES PATENT OFFICE

EDWARD G. VANDERLIP, OF WASHINGTON, DISTRICT OF COLUMBIA

SAFETY DEVICE FOR AIRPLANES

Application filed September 12, 1930. Serial No. 481,550.

This invention relates to safety devices for aircraft and more particularly to devices of this class which are designed to prevent the stalling of an airplane due to insufficient flying speed.

An airplane is said to be stalled when the angle of incidence of the wings of the plane,— or the angle of attack, as it is also called,— is so great with respect to the speed of the craft through the air, that the air flow around the surfaces of the wings is no longer sufficient to sustain the airplane in its normal controlled flight. In this condition, the manipulation of the lateral controls is practically without effect and as a frequent consequence the plane goes into a tail spin and a disastrous crash results.

Various expedients have been employed to forewarn the pilot of the imminence of this dangerous condition and also to minimize the effects of a too greatly increased angle of attack, such as, for example, speed indicators, wing slots, and even extensive modifications in the general structural design of the airplane itself, but all of these have proved inadequate as a sure preventive of accidents caused by the stalling of the plane.

The principal object of the present invention is to provide a novel mechanism, which is adapted to be applied to an airplane to prevent the stalling thereof.

Another object of the invention is to provide a novel mechanism of this type which is designed to affect the manual controls of an airplane under impending stalling conditions by exerting a tendency to prevent further increase in the angle of attack and to cause the aircraft to assume such a decreased angle of attack as will enable it to regain a safe flying speed.

Other objects and features of novelty will be apparent from the following specification when read in connection with the accompanying drawings, in which certain embodiments of my invention are illustrated by way of example.

Figure 1 is a view in side elevation of an airplane equipped with one form of my novel safety device, the position of the device being indicated diagrammatically in dotted lines;

Figure 2 is a view in side elevation on an enlarged scale of the safety device shown in Figure 1, showing the same in a rather diagrammatic manner as applied to a longitudinal control mechanism of a conventional type;

Figure 3 is a fragmentary perspective view of a portion of the wing of an airplane illustrating the installation of another embodiment of my invention; and Figure 4 is a partly diagrammatic plan view of another embodiment of my invention.

In the drawings, the numeral 10 designates generally an airplane upon which my improved safety device has been installed. The airplane 10 is provided with the fuselage 11, wings 12, propeller 13, landing gear 14, rudder 15, and elevator 16.

A longitudinally reciprocating rod 17 is provided for controlling the actuation of the elevator 16. This elevator control rod 17 is pivotally connected to the elevator by means of the arm 18 or other similar construction, and is connected at its forward end to the control stick 20 as by means of the pivot 21. The stick 20 is pivoted at 22 for longitudinal swinging movement and is provided at its upper end with the handle portion 23. It will be readily understood that movement of the stick 20 in a forward direction will lower the rear edge of the elevator 16 and cause the plane to descend. Similarly a rearward movement of the stick will serve to raise the rear end of the elevator 16 about its pivot 23 and cause the plane to ascend or to assume an increased angle of incidence or attack with respect to the flow of the air. The stick 20 is also adapted to be moved laterally to control the ailerons of the airplane.

The elevator control rod 17 is provided with an abutment 25 which is adapted to be contacted by an element of my novel stall preventing device which will now be described.

In the embodiment illustrated in Figures 1 and 2 of the drawings the numeral 27 indicates a rotary air motor which may be of any suitable type but which is illustrated as comprising a fan having radially projecting blades similar to the propeller of the airplane. This wind motor 27 is supported for rotation by means of the bracket 28 which is mounted upon a suitable portion of the airplane which is outside of the slip stream of the propeller, so that the motor 27 will be affected only by the free air flow past the plane. A flexible torque shaft 30 is adapted to transmit the torque developed by the wind motor 27 to the governor 31 which may be of any suitable type but is illustrated as a fly-ball governor in Figures 1 and 2 of the drawings. The ball-carrying arms 32 of the governor are pivoted as at 33 to a sleeve 34 mounted for rotation in a suitable bracket 35. Upon the forward end of the sleeve 34 is disposed the beveled gear 36 with which a gear 37 driven by the flexible torque shaft 30 is adapted to mesh. Passing freely through the center of the sleeve 34 is the longitudinally reciprocable shaft 38 which is guided in its movement also by the bracket 39. As a means for causing the rod or shaft 38 to reciprocate longitudinally in accordance with the speed of rotation of the governor, the pivotally mounted sleeve 40 is provided which is connected to intermediate points on the rods 32 by means of the links 41. The sleeve 40 is rotatable relatively to the rod 38 but it is prevented from moving longitudinally relative thereto. It will thus be seen that as an increase in the speed of rotation of the governor causes the fly-balls 42 to move outwardly the collar 40 will move forwardly carrying with it the rod 38. The forward end of the rod 38 is pivotally connected as at 44 with the lever 45 which is fulcrumed at 46, and the upper end 47 of the lever 45 is adapted to contact with the abutment 25 carried by the elevator control rod 17 when it occupies certain positions relative thereto.

Upon the rear end of the rod 38 there is disposed an enlargement or abutment 48. Between this abutment and the forked end 60 of a lever 58 through which the rod 38 is adapted to pass, there is disposed a compressible coil spring 50 which surrounds the end of the rod 38. It will be understood that the rotation of the governor 31 and the consequent forward movement of the rod 38 and corresponding rearward movement of the upper end 47 of the lever 45, will be resisted to some extent by the compression of the spring 50. By this means, a slowing down or cessation of movement of the wind motor 27 and governor 31 will permit the spring 50 to move the rod 38 rearwardly and thus bring the upper end 47 of the lever 45 in a direction toward the abutment 25.

Thus it will be seen that upon a loss of flying speed due to an effort on the part of the operator to climb too rapidly or for any other cause, the wind motor 27 and the governor 31 driven thereby, will slow down permitting the spring 50 to move the lever end 47 forwardly toward the abutment 25 and will tend to resist any effort of the operator to move the stick 20 rearwardly, and will exert a tendency to force the operator to move the stick forwardly and thus cause the plane to descend or seek a position wherein the angle of incidence is decreased, and thus avoid stalling.

As a means for adjusting the safety device for variation in the weight of the load carried by the plane and for rendering the safety device inoperative for any reason, there is provided the manually operable lever 52 provided at its upper end with the handle 53 and fulcrumed as at 54. The lower end of the lever 52 is pivoted at 55 to a link 56 which is pivotally connected at its rear end 57 to the lower end of the lever 58. The lever 58 is pivoted at 59 and is provided at its upper end with the forked stop 60 already mentioned.

The hand lever 52 is provided with a quadrant 61 which may be graduated in accordance with the weight of the load carried by the plane. When the lever is in its rearmost position, the stop 60 is also at its rearmost position and causes a greater initial compression of spring 50, thus moving the upper end of the lever 45 against the abutment 25 and urging the elevator control toward its extreme forward position. On the other hand, when the hand lever 52 is moved to the position designated "off" the lever 58 serves to move the abutment 48 forwardly, permitting the upper end 47 of the lever 45 to move to its rearmost position indicated by dotted lines in the drawings, whereby all control of the anti-stalling device is removed from the elevator actuator.

It is obvious that with an increased load a plane will stall quicker than when flying light and provision is made for the adjustment of the anti-stalling device to provide for variations in load. The same lever 52 may be adjusted at various points on the quadrant 61 thus applying a variable compression to the spring 50 and causing the wind motor 27 to be of greater or less effect according to the weight carried by the plane. With a light load, the lever 52 might be set at the point designated "I" on the quadrant 61 and a very slight compression would be applied to the spring 50. Under this setting, a very slight speed of the motor 27 and governor 31 will suffice to prevent the stop 47 from affecting the elevator control and the safety device will not be effective until a great loss of flying speed has occurred. On the other hand, if the lever 52 be set at point "3" on the quadrant 61 the spring will be subjected to a greater compression and the rod 38 will be urged rearwardly and the stop 47 forwardly so that a slight diminution in the speed of the motor 27 and governor 31 will permit the effective actuation of the anti-stalling mechanism.

In the embodiment shown in Figure 4, the numeral 38' indicates the forward end of a governor shaft similar to the shaft 38 shown in Figure 2. The movement of this shaft 38' is accomplished in exactly the same manner as that disclosed in Figures 1 and 2. The numeral 65 designates a bracket secured to any suitable stationary portion of the aircraft and which is provided with the two arms 66 and 67. The arm 66 is provided with means for supporting the rod 38' for reciprocating movement and the arm 67 is provided with a bearing 68 for the rotary shaft 69. The shaft 69 is provided at its end with a pinion 70 which is adapted to be driven by a rack 71 formed upon the forward end of the shaft 38'. An intermediate portion of an elevator control rod 17' is shown in Figure 4 as being provided with the wedge shaped member 73. Positioned laterally of this rod 17' and member 73 is the abutment and contact 74 which may be caused to approach and recede from these members by means of the connection 75 with the threaded end 76 of the rotary shaft 69. It will be appreciated that a forward movement of the governor shaft 38' will cause the pinion 70 and shaft 69 to rotate in a clockwise direction as viewed from the lower side of Figure 4. This will cause the member 74 to be retracted from the vicinity of the wedge 73 and will permit the stick 20,—which incidentally is connected in this embodiment at the right hand end of the rod 17',—to be moved rearwardly to elevate the longitudinal control 16. If, due to a diminished air speed and a consequent slowing of the wind motor 27 and governor 31, the rod 38' be moved toward the right in Figure 4, the counterclockwise motion of the shaft 69 will cause the contact abutment 74 to move toward the rod 17' and wedge 73. This will effectively prevent the movement of the elevator controls to a position to further increase the angle of incidence of the aircraft and will prevent stalling thereof.

As a further means of warning the operator of a dangerous position of his elevator controls there may be provided a lamp or other signal 78 connected in series with the battery or other source of current 79 and the contact abutment 74 and the rod 17' and wedge 73 by means of the conductor 80. The conductor 80 may be secured to the control member 17' by means of the connection 81.

In Figure 3, there is disclosed a modification of my novel anti-stalling device which is somewhat simpler in design than the embodiments just described. Secured by means of the bearings 85 to the wing 86 of an airplane is the rock shaft 87. Upon the outer end of the rock shaft 87 is formed the crank arm 88, upon the upper end of which is disposed a cup 89, vane or other suitable device adapted to be actuated by the free air flow around the wings of the plane. Upon the inner end of the rock shaft 87 is provided the upwardly extending arm 90 which has a forked upper end 91 adapted to embrace the elevator control rod 17a which is pivotally connected at its forward end to the stick 20' as at 21'. Upon the rod 17a is fixed the abutment 25' which is adapted to contact the forked end 91 of the lever 90. Secured at a suitable point upon the lever arm 90 is one end of the extensible spring 92. The other end of the spring is attached to the upper end of a lever 93 fulcrumed at 94 and pivotally connected at its lower end by means of a link 95 to the lower end of a manually controlled lever 52'. This lever 52' is fulcrumed as at 54' and is provided with a quadrant 61' similar to the embodiment disclosed in Figure 2. It will be obvious that the same adjustments for rendering the device inoperative and for adapting it to variations in load may be effected by the lever 52' as in the case of the device disclosed in Figure 2.

It will be realized that a decrease in air speed will permit the arm 88 at the outer end of the rock shaft 87 to move forwardly under the influence of the spring 92 and will cause the forked extension 91 of the lever arm 90 to contact with the abutment 25' on the elevator control rod 17a and thus tend to force the operator to adjust his elevator controls to reduce the angle of incidence or attack of the airplane.

It will be obvious that various changes and modifications may be made in the embodiments of the invention as disclosed herein without departing from the scope of the invention as defined in the following claims.

Having thus described the invention, what is claimed as new and desired to be secured by Letters Patent is:

1. In an aircraft provided with a suitable elevator control, a device adapted to prevent stalling of the aircraft comprising, in combination, means actuated in response to the air speed of the aircraft, a centrifugal governor driven by said means, and means operated thereby to limit the movement of said elevator control.

2. In an aircraft provided with a suitable elevator control, a device adapted to prevent loss of flying speed comprising, in combination, an air motor, a governor driven thereby, and means actuated by said governor tending to limit the movement of said elevator control.

3. The combination as set forth in claim 2 in which there is provided means for adjusting the effective operation of said governor in accordance with the load carried by the aircraft.

4. In an aircraft provided with a suitable elevator control, a device adapted to prevent stalling comprising, in combination, a rotary wind motor mounted upon a portion of said aircraft and exposed to the action of the free air flow, a governor operatively connected to said motor, an adjustable stop adapted to prevent manipulation of said elevator control beyond the point at which said stop is adjusted, and connections between said governor and said stop whereby a variation in speed of said motor effects an adjustment of said elevator control stop.

5. In an aircraft equipped with a suitable reciprocating elevator control, a device for preventing the free manipulation of said control under impending stalling conditions comprising, in combination, a rock shaft, a crank arm on one end of said rock shaft, an abutment carried by said reciprocating control, a stop carried by the outer end of said crank arm and adapted to contact with said abutment to limit the movement of said control in a direction to increase the angle of incidence of the aircraft, and a pressure responsive device mounted on the opposite end of said rock shaft, exposed to the free air flow past the aircraft and adapted to rock said shaft upon variation in the air speed of the aircraft to adjust the position of the stop for said elevator control.

6. In an aircraft provided with a suitable reciprocating elevator control element, a safety device designed to affect said control element to prevent adjustment thereof to a position permitting stalling of the plane comprising, means exposed to the free flow of air past said aircraft, means operatively connected to said first named means and adapted to transversely approach and recede from said element, and tapering means disposed upon said element for contacting with said transversely movable means to prevent movement of said control element beyond stalling positions.

7. In an aircraft having a longitudinally reciprocating manually operated elevator control element, a stall preventing device comprising, in combination, means exposed to the free air flow past the aircraft, a reciprocating member operatively connected to said means and movable in response to variations in the effect of air flow upon said means, a rack carried by said member, a transverse rotatable shaft, a pinion carried by said shaft and adapted to mesh with said rack, a threaded portion on said shaft, a reciprocable non-rotatable head disposed adjacent said control element having a threaded perforation adapted to receive said threaded portion of said shaft, and a wedge-shaped contact member carried by said control element and adapted to be abutted by said head upon reciprocation of said head in response to variations in air flow whenever said control element is disposed in a position wherein the angle of incidence of the aircraft is such with relation to said air flow that stalling is imminent.

8. The combination set forth in claim 7 in which there is provided a signal, and an electrical circuit for operating said signal including a source of current and the contacting portions of said head and said control element.

9. An aircraft provided with a suitable elevator control, a device adapted to prevent loss of flying speed, in combination, an air motor, a centrifugal governor driven thereby, means actuated by said governor tending to limit the movement of said elevator control and means for rendering said limiting means inoperative at the will of the operator.

In testimony whereof I hereunto affix my signature.

EDWARD G. VANDERLIP.